(12) United States Patent
Malin

(10) Patent No.: US 12,510,977 B2
(45) Date of Patent: Dec. 30, 2025

(54) CONTACTLESS INTERACTIVE PERIPHERAL INTERFACE

(71) Applicant: James Christopher Malin, Temecula, CA (US)

(72) Inventor: James Christopher Malin, Temecula, CA (US)

( * ) Notice: Subject to any disclaimer, the term of this patent is extended or adjusted under 35 U.S.C. 154(b) by 176 days.

(21) Appl. No.: 18/411,602

(22) Filed: Jan. 12, 2024

(65) Prior Publication Data
US 2024/0256055 A1 Aug. 1, 2024

Related U.S. Application Data

(60) Provisional application No. 63/507,315, filed on Jun. 9, 2023, provisional application No. 63/481,800, filed on Jan. 27, 2023.

(51) Int. Cl.
| | |
|---|---|
| *G06F 3/01* | (2006.01) |
| *G03H 1/04* | (2006.01) |
| *G06F 3/023* | (2006.01) |
| *G06F 3/16* | (2006.01) |

(52) U.S. Cl.
CPC .............. *G06F 3/023* (2013.01); *G03H 1/04* (2013.01); *G06F 3/013* (2013.01); *G06F 3/016* (2013.01); *G06F 3/017* (2013.01); *G06F 3/167* (2013.01)

(58) Field of Classification Search
CPC .......... G06F 3/023; G06F 3/013; G06F 3/016; G06F 3/017; G06F 3/167; G06F 3/038; G03H 1/04
See application file for complete search history.

(56) References Cited

U.S. PATENT DOCUMENTS

| | | | |
|---|---|---|---|
| 11,048,329 B1 | 6/2021 | Lee et al. | |
| 11,392,206 B2 | 7/2022 | Lee et al. | |
| 2020/0042268 A1* | 2/2020 | Kim | G06F 3/04886 |
| 2022/0326776 A1 | 10/2022 | Lee et al. | |
| 2023/0315247 A1* | 10/2023 | Pastrana | G06F 1/1626 |
| | | | 715/716 |
| 2024/0104877 A1* | 3/2024 | Henderson | G06T 15/506 |
| 2024/0361832 A1* | 10/2024 | Calderone | G02B 27/017 |

* cited by examiner

*Primary Examiner* — Rinna Yi
(74) *Attorney, Agent, or Firm* — KNOBBE, MARTENS, OLSON & BEAR, LLP

(57) ABSTRACT

Systems and methods relating to a contactless peripheral interface, including a method comprising: receiving a selection of a peripheral interface from a host computing device, wherein the selection corresponds to one of plurality of peripheral interfaces, generating, by an image system, a floating image based on the selected peripheral interface, sensing, by a sensor assembly, a position of a user interaction with the floating image of the peripheral interface, mapping, by a controller, the position of the user interaction to an input relating to the selected peripheral interface, and communicating the input to the host computing device, wherein the host computing device is configured to recognize the input as relating to the selected peripheral interface.

12 Claims, 14 Drawing Sheets

# CONTACTLESS INTERACTIVE PERIPHERAL INTERFACE

PRIORITY AND RELATED APPLICATIONS

This application claims the benefit of U.S. Provisional Application No. 63/507,315 filed on Jun. 9, 2023, and U.S. Provisional Application No. 63/481,800 filed on Jan. 27, 2023. This application is related to U.S. application Ser. No. 17/938,631 filed on Oct. 6, 2022. All of the above-listed disclosures are incorporated herein by reference in their entirety. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for generating an image that is perceived by a user to be floating (a "floating image") of a peripheral interface, receiving user selections from a user's interaction with portions of the floating image, and communication the user selections to a host computing device.

BACKGROUND

Mobile phones, tablets, desktop computers, laptop computers, wearable devices, smart devices, vehicle cabins, home entertainment systems, industrial equipment, thermostats, lighting devices, household appliances, etc. and the like are just some of the computing devices users interact with, where the user provides an input which is processed by a controller of the device. Such interactions can include using a touch-sensitive surface, a mouse, a remote control, joystick, a wired controller, etc.

COVID-19 and its variants have demonstrated that infectious disease pandemics are a real danger. Although people are more aware of hygiene than ever before, we still face infection risks from contact with surfaces of controls that we physically interact with to operate a device. Accordingly, it would be advantageous for preventing, or minimizing, the spread of infectious diseases to be able to interact with devices without actually touching the controls of the device and associated peripherals such as, a touch-sensitive surface, a mouse, a keypad, a keyboard, and the like.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

The features and advantages of the contactless peripheral interface system and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION

Figure 1:
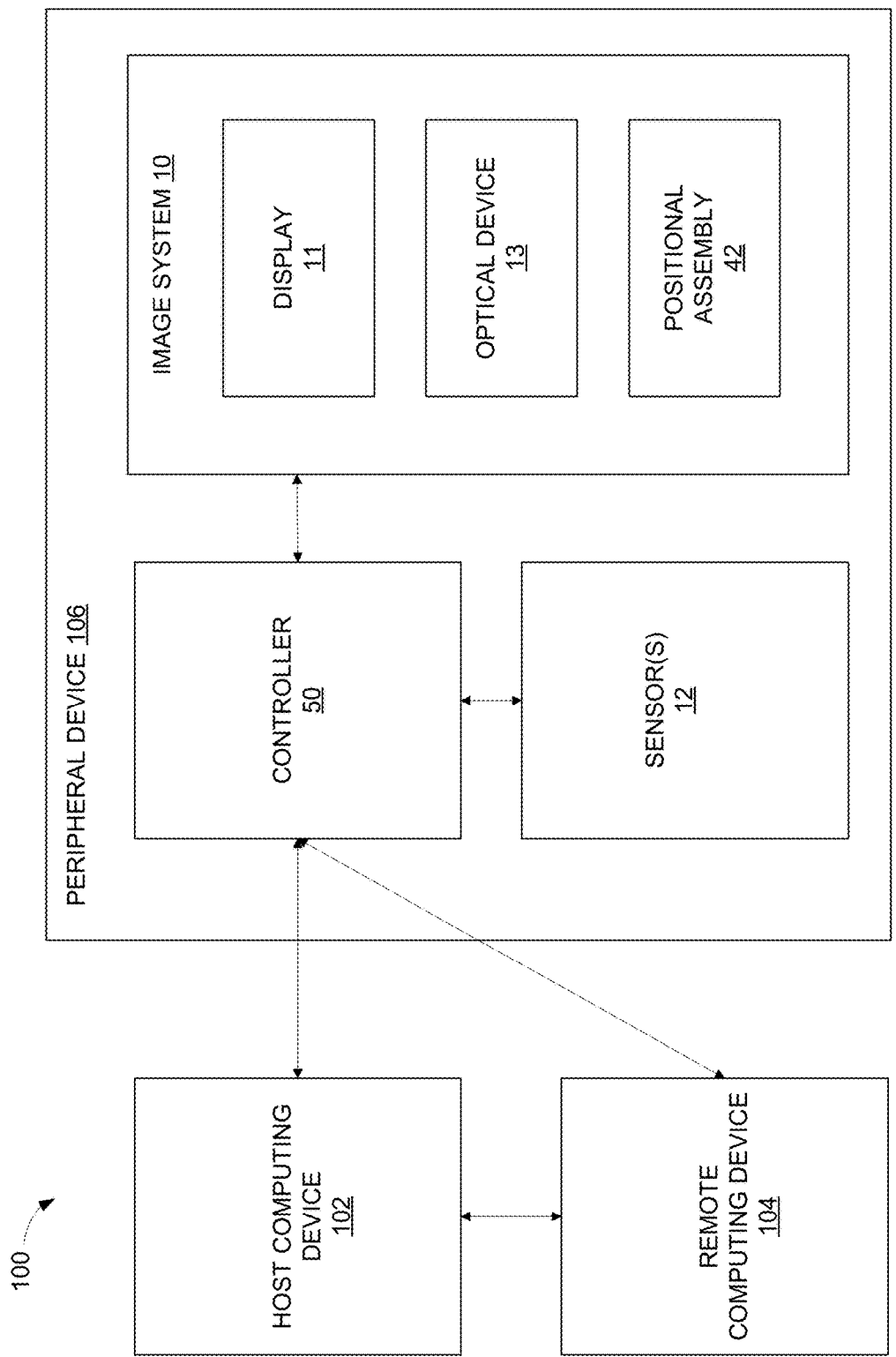
FIG. 1 illustrates an example contactless peripheral interface system.

Embodiments of systems and methods of providing a contactless peripheral interface ("contactless interface," "contactless peripheral interface," "peripheral interface," "peripheral input interface," or "interface") are disclosed herein. Embodiments of the systems and methods described herein eliminate the need for physical contact with a traditional peripheral input device, such as a mouse or keyboard, without requiring users to change their behavior in any significant way.

In some embodiments, methods and systems as described herein relate to providing a peripheral device that can be in communication with a computing device, and that is configured with a contactless interface that a user can interact with to provide information to the computing device. The contactless interface generates a floating image which has selectable portions, such that when a user interacts with the floating image by "touching" a portion of the floating image thus selecting the touched portion, the contactless interface determines which portion of the floating image was selected and provides information of the selection ("information") to the computing device. For example, the peripheral device can be in communication with a host computing device and provides information to, and may control (e.g., control a function of), the host computing device. In some embodiments, the peripheral device can also provide such information to a remote computing device. A "host computing device" as used herein can be any computing device the peripheral device is in communication with to provide information relating a user interaction with the contactless interface of the peripheral device. In some embodiments, the host computing device may be co-located with the peripheral device. For example, in the same room of building. A "remote computing device" as used herein can be any computing device the peripheral device is in communication with and may provide information relating a user interaction with the contactless interface of the peripheral device. In some embodiments, the remote computing device may be co-located with the peripheral device, in the same room or building. In some embodiments, the remote computing device is not co-located with the peripheral device. For example, the remote computing device may be in communication with the peripheral device and be located anywhere. The remote computing device may provide interface information to the host computing device and the peripheral device. For example, one or more different interface representations and/or information relating to selectable portions of the interface representations. In some embodiments, a peripheral interface map may be provided to map locations of user interaction with the floating image with inputs corresponding to the peripheral interface. In some embodiments, a peripheral interface may include a keyboard, a trackpad, a numpad, and/or any other peripherals configured to receive user input.

In some embodiments, a method, comprising: receiving a selection of a peripheral interface from a host computing device, wherein the selection corresponds to one of plurality of peripheral interfaces; generating, by an image system, a floating image based on the selected peripheral interface; sensing, by a sensor assembly, a position of a user interaction with the floating image of the peripheral interface; mapping, by a controller, the position of the user interaction to an input relating to the selected peripheral interface; and communicating the input to the host computing device, wherein the host computing device is configured to recognize the input as relating to the selected peripheral interface.

In some embodiments, mapping the position of the user interaction to an input relating to the selected peripheral interface further comprises receiving, from the host device, an interface map for the selected peripheral interface; and associating the positions of the user interaction with inputs onto the peripheral interface according to the interface map.

In some embodiments, the input corresponds to at least one of a key selection, cursor movement, or a gesture of the peripheral interface.

In some embodiments, the host computing device is configured to recognize the input as ASCII data, numeric data, coordinate data, motion data, hardware control data, and commands.

In some embodiments, the plurality of peripheral interfaces includes a keyboard, a trackpad, a keypad, a numpad, a control menu, a volume control, and a video control menu.

In some embodiments, implementations of the contactless peripheral interface further comprise updating a display of the host computing device corresponding to the input.

In some embodiments, implementations of the contactless peripheral interface further comprise receiving the selection of the peripheral interface from a remote computing device; and communicating the input to the remote computing device, wherein the remote computing device is configured to recognize the input as relating to the selected peripheral interface.

In some embodiments, a contactless peripheral interface system, comprising: a peripheral device in communication with a host computing device including: an image system configured to generate a floating image of an peripheral interface; a sensor assembly configured to sense a position of a user interaction with the floating image of the peripheral interface; and a controller having a computer hardware processor in communication with the image system and the sensor assembly, the controller configured to: receive a selection of the peripheral interface from the host computing device, wherein the selection corresponds to one of plurality of peripheral interfaces; coordinate generation of the floating image based on the selected peripheral interface; receive the position of the user interaction with the floating image of the peripheral interface; map the position of the user interaction to an input relating to the selected peripheral interface; communicate the input to the host computing device, wherein the host computing device is configured to recognize the input as relating to the selected peripheral interface.

In an embodiment, mapping the position of the user interaction to the input relating to the selected peripheral interface further causes the controller to receive, from the host device, an interface map for the selected peripheral interface; and associate the positions of the user interaction with inputs onto the peripheral interface according to the interface map.

In an embodiment the input corresponds to at least one of a key selection, cursor movement, or a gesture of the peripheral interface.

In some embodiments, the host computing device is configured to recognize the input as ASCII data, numeric data, coordinate data, motion data, hardware control data, and commands.

In some embodiments the plurality of peripheral interfaces includes a keyboard, a trackpad, a keypad, a numpad, a control menu, a volume control, and a video control menu.

In some embodiments the controller is further configured to update a display of the host computing device corresponding to the input.

In some embodiments, the system further comprises: a remote computing device in communication with the peripheral device, wherein the controller is further configured to: receive the selection of the peripheral interface from a remote computing device; and communicate the input to the remote computing device, wherein the remote computing device is configured to recognize the input as relating to the selected peripheral interface.

In some embodiments, a method, comprising: generating, by an image system, a floating image of a peripheral interface; sensing, by a sensor assembly, a position of a user interaction with the floating image of the peripheral interface; mapping, according to an interface map, the position of the user interaction to an input relating to the selected peripheral interface, wherein the interface map comprises positional information associated with the selected peripheral interface; communicating the input to the host computing device, wherein the host computing device is configured to recognize the input as relating to the selected peripheral interface.

In some embodiments, the input corresponds to at least one of a key selection, cursor movement, or a gesture of the peripheral interface.

In some embodiments, the positional information of the interface map comprises locations of the interface associated with key selections.

In some embodiments, the input corresponds to at least one of a key selection, cursor movement, or a gesture of the peripheral interface.

In some embodiments, the host computing device is configured to recognize the input as ASCII data, numeric data, coordinate data, motion data, hardware control data, and commands.

In some embodiments, the peripheral interface includes a keyboard, a trackpad, a keypad, a numpad, a control menu, a volume control, and a video control menu.

The following is a general list of certain annotations and components that are described and enumerated in this disclosure in reference to the above-listed figures. However, any aspect, structure, feature or operational function of the devices illustrated in the figures, whether or not named out separately herein, can form a portion of various embodiments of the invention and may provide basis for one or more claim limitation relating to such aspects, with or without additional description. The terminology in this list is not meant to be limiting but instead is a general list of certain components. In some instances, these listed components may be referred to with terminology other than listed below. Also, in certain instances, a group of components may be referred together using terminology or a phrase not listed below. Additional annotations and/or components may be illustrated in the figures. The annotations and enumerated components include:

- 10—image system
- 11—display or light-emitting device ("means of illumination")
- 12—sensor(s)
- 13—optical device (e.g., optical array)
- 14—floating image
- 15—emitted signal (e.g., IR) from touch sensor
- 16—example application
- 17—operation of indication (selection of a portion of the floating image)
- 18—in air contact
- 19—emitted light from display
- 20—light propagated from optical device (e.g., reflected light)
- 21—angle of reflection
- 24—angular alignment of the display and optical device
- 42—positional assembly
- 50—controller
- 51—2nd surface of optical device
- 53—signal from user sensor
- 100—contactless peripheral interface system
- 102—host computing device
- 104—remote computing device
- 106—peripheral device
- 202—communication system
- 204—peripheral interface controls
- 206—processor(s)
- 208—memory
- 300—peripheral interface selection menu
- 302—peripheral interface selection icon
- 310—peripheral interface selections
- 400—keyboard peripheral interface
- 402—peripheral interface toggle 402
- 404—keyboard
- 500—numpad peripheral interface
- 502—numpad
- 600—device control peripheral interface
- 602—device control menu
- 700—arrows peripheral interface
- 702—arrow key selections
- 800—video player peripheral interface
- 802—video player menu
- 900—trackpad peripheral interface
- 902—start point of dragging movement on trackpad
- 902'—end point of dragging movement on trackpad
- 1002—start point of cursor
- 1002'—end point of cursor
- 1102—user interaction
- 1104—input on trackpad peripheral interface
- 1105—input on device control peripheral interface
- 1106—input on arrows peripheral interface FIG. 1 illustrates an example contactless peripheral interface system 100. In some embodiments, a contactless peripheral interface system 100 includes a host computing device 102 and peripheral device 106. In some embodiments, a contactless peripheral interface system 100 includes host computing device 102, remote computing device 104, and peripheral device 106. In other embodiments, one or more additional remote computing devices may be communication with either or both of the host computing device 102 and the peripheral device 106. Accordingly, the remote computing device 104 may represent one or more remote computing devices 104. In some embodiments, one or more peripheral devices 106 can be connected to a host computing device 102 and/or a remote computing device 104. Accordingly, the peripheral device 106 may represent one or more peripheral devices 106. When two or more peripheral devices 106 is in communication with the same host computing device 102, each of the peripheral devices 106 can provide information to the host computing device 102 based on a user interaction with the floating image they each generate.

In some embodiments, host computing device 102 and remote computing device 104 may be any device capable of interacting within contactless peripheral interface system 100. For example, host computing device 102 and remote computing device 104 may include personal computing devices, laptop computing devices, tablet computing devices, electronic reader devices, wearable computing devices, mobile devices (e.g., cellular, and other mobile phones, smart phones, media players, handheld gaming devices, etc.), streaming media devices, and various other electronic devices and appliances.

In some embodiments, host computing device 102 may be communicatively coupled to remote computing device 104. For example, host computing device 102 may be connected to remote computing device 104 using a wired connection. Connections between the host computing device 102 and remote computing device 104 are not limited to wired connections but may instead work through wireless communication such as BLUETOOTH®, Wi-Fi®, according to an IEEE 802 standard, etc. Host computing device 102 and remote computing device 104 may also be communicatively coupled to peripheral device 106 through any of the described methods above.

In some embodiments, peripheral device 106 may be any device configured to generate a floating image of a peripheral interface, receive input by a user of portions of the peripheral interface on the floating image, and transmit said input to host computing device 102 and/or remote computing device 104. As used herein, a floating image is an image that is generated by the image system that appears to be floating, for example, in front of or above a surface, and that includes portions (e.g., similar to buttons on a touch interface) that are indicative of a possible selection by a user.

In some embodiments, a peripheral interface may be any interface configured to receive user input and provide information to a host computing device 102 and/or a remote computing device 104 to control or update a functionality of the host computing device 102 or remote computing device 104. For example, a physical keyboard peripheral device may be used to input and transmit ASCII data to a computing device. Similarly, a keyboard peripheral interface may be generated as a floating image by the peripheral device 106. The keyboard peripheral interface may detect a portion (e.g., a location) of the floating image that a user interacts with by "touching" the floating image (e.g., with a finger, hand, object, etc.) enabling an operation of indication to be determined as it crosses through or touches a point on the floating image in air, and recording and/or processing the X,Y- coordinates and/or X, Y, Z-coordinates on the floating image as input, providing a hygienic method for transmitting control data to a separate device (e.g., host computing device 102 or remote computing device 104). In some embodiments, a user may choose between peripheral interfaces such as a keyboard, trackpad, keypad, mouse click buttons, standard button controls such as play, stop, right, left, and the like. Accordingly, user input may include key selections, gestures, movements, etc.

The peripheral device 106 is configured to provide a floating image interface that is perceivable by a user when the user is at a certain location with respect to the interface (e.g., the user's eyes are at a certain location or position relative to the interface). In some embodiments, the floating image interface can be, or appear to be, a holographic image. In some embodiments, peripheral device 106 is further configured to determine information related to a user and use the information to position the floating image so that the user can perceive the floating image. In various embodiments, the peripheral interface can use a sensor(s) 12 to sense one or more physical characteristics of the user, for example, the user's height, the location of the user's eyes, and/or the proximity (e.g., distance) from the interface, etc.

As shown in FIG. 1, peripheral device 106 may include controller 50, sensor(s) 12, and image system 10. In some embodiments, the controller 50 may include at least one hardware processor. In some embodiments, the controller 50 is in communication with sensor(s) 12 and processes information received from the sensor(s) 12 to control the peripheral interface. For example, the controller 50 can receive information indicating the presence of a user and activate the display 11 to generate the floating image 14. In another example, the controller 50 can receive information indicating the height, eye position, and/or a distance to the user, and the controller 50 can control the positional assembly 42 to move one or more of the display 11 and the optical device 13 to position the floating image at an angle or a location that may be best perceived by the user. The controller 50 can provide an output to host computing device 102 and/or remote computing device 104 based on information from the touch sensor 12 indicative of the input of a user (e.g., the selection of an item depicted on the floating image 14).

In some embodiments, sensor(s) 12 may include one or more sensors. For example, sensor(s) 12 may include a first sensor assembly, or user sensor. In some embodiments, sensor(s) 12 may include a sensor that is configured to determine one or more physical characteristics that are associated with a user. The physical characteristic can be for example, the presence of a user (e.g., if a user is near/within a certain distance of the user sensor), user face detection, a height of the user, the position of the user's eyes, a position of the user relative to the peripheral interface apparatus, a distance of the user relative to the peripheral interface apparatus, the line-of-sight of the user, one or more hand gestures of the user that are not interactions with the floating image, and the like. The user sensor can include one or more of various user technologies, including but not limited to infrared (IR), ultrasonic, vertical-cavity surface-emitting laser (VCSEL), light detection and ranging (LIDAR), one or more cameras, etc. In some embodiments, the user sensor functionality can be performed by the same sensor assembly as the touch sensor such that the first sensor assembly is also the second sensor assembly. For example, by using a camera, webcam, and the like as the first sensor assembly and the second sensor assembly.

In some embodiments, sensor(s) 12 may include a second sensor assembly, or a touch sensor. In some embodiments, sensor(s) 12 may include one or more sensors that are configured to sense a user interaction with the floating image, and in particular, to sense information that can be used to determine what portion of the floating image the user interacted with (e.g., one or more holographic buttons depicted in the floating image). In some examples, the actuation sensor is positioned on the peripheral interface such that it is along the bottom portion of the floating image. In other examples, it can be positioned in other areas. In an example, the actuation sensor comprises an IR sensor array. In another example, the actuation sensor comprises one or more cameras. In other examples, the touch sensor can include ultrasonic, vertical-cavity surface-emitting laser (VCSEL), and/or light detection and ranging (LIDAR) sensors. In some embodiments, the touch sensor functionality can be performed by the same sensor assembly as the user sensor such that the first sensor assembly is also the second sensor assembly. For example, by using a camera, webcam, and the like as the first sensor assembly and the second sensor assembly. In some embodiments, the touch sensor can be configured to also scan barcodes, QR codes, and the like.

As used herein, an image system is a broad term that refers to a system that generates a floating image. For example, a two-dimensional (2D) floating image or a three-dimensional (3D) floating image. As illustrated in FIG. 1, the contactless peripheral interface system 100 includes an image system 10. The image system 10 can include a display 11 and an optical device 13. In some embodiments, the image system 10 can also include one or more other components, including for example, a positional assembly 42, to move the display (e.g., rotate the display around an axis and/or move the display in one or more of an x, y, z-direction), and/or to move the optical device (e.g., rotate the optical device around an axis and/or move the optical device in one or more of an x, y, z-direction). In an embodiment, the image system 10 receives a control signal to generate the floating image when a user is within a certain (e.g., predetermined) proximity of the peripheral interface, e.g., based on information sensed by the sensor(s) 12.

As used herein, a display is a broad term and refers to any light-emitting display where the emitted light can be used to generate a floating image. In an embodiment, display 11 can refer to a display panel of a computing device, for example, a tablet computer, a laptop computer, a watch, a phone or other mobile device, or another display panel that can render an image. A display typically is planar and provides light in a two-dimensional format, for example, as a still image of a series of images (e.g., video) that can be perceived by a user. In the illustrative examples described herein, a display is a component of the image system. Different type of display technologies can include liquid crystal displays (LCD), light emitting diodes (LED), organic light emitting diodes (OLED), plasma displays, field emission displays, electronic paper, cathode ray tube (CRT), digital light processing (DLP), and the like.

As used herein, a positional assembly is a broad term that refers to a single device or mechanism, or more than one device or mechanism, which is used to move the peripheral interface, the image system 10, and/or components of the image system 10, which affects the position of the generated floating image. In some embodiments, the positional assembly 42 is coupled to the image system 10 and moves the peripheral interface as a whole, or the image system, around an axis or moves the image system in one or more of an x, y, z-direction. In some embodiments, the positional assembly 42 is coupled to the display and configured to move the display (e.g., rotate the display around an axis or move the display in one or more of an x, y, z-direction), and/or to move the optical device 13 (e.g., rotate the optical device around an axis and/or move the optical device in one or more of an x, y, z-direction). In some embodiments, the positional assembly 42 moves components it is coupled to based on information from the user sensor (e.g., sensing proximity of the user, a distance to the user, the user's height, eyes, or line-of-sight). In some embodiments, the positional assembly 42 is configured to move the touch sensor in corresponding to a position that the floating image is generated, to form a detection zone near the floating image. In some embodiments, a positional assembly is configured to move the user sensor in corresponding to a position for better detection of user characteristics, based on for example, the position of the floating image and/or a detected position of a user.

In some embodiments, optical device 13 may be a component of the image system that receives light from a display and provides light in a manner that is perceived by a user to be a "floating image." In one example, an optical device is an optical array. In some examples, the optical array is a transmissive dihedral corner reflector array, a transmissive mirror device, and the like. See FIG. 12 for additional details on generation of the floating image by peripheral device 106.

Figure 2:
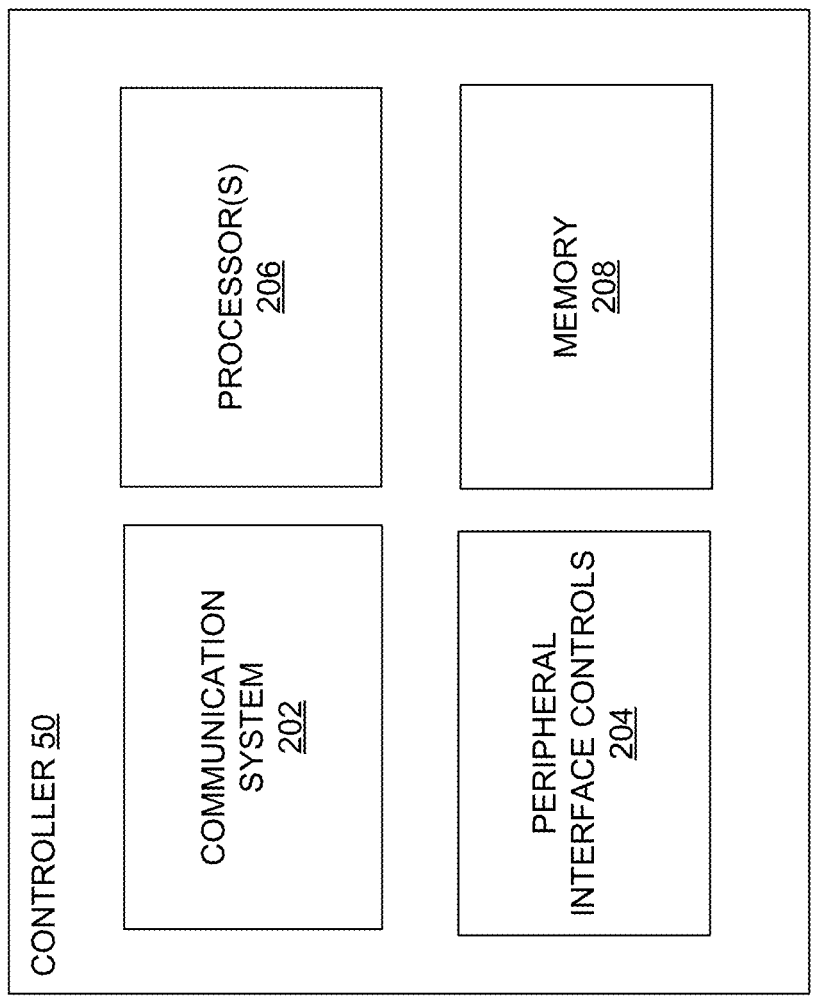
FIG. 2 is a block diagram illustrating components of a controller within the contactless peripheral interface system.

FIG. 2 is a block diagram illustrating components of a controller 50 within the contactless peripheral interface system 100. As shown in FIG. 2, controller 50 includes communication system 202, peripheral interface controls 204, processor(s) 206, and memory 208.

Processor(s) 206 may be, for example, one or more general purposes microprocessors.

Controller 50 also includes memory 208, such as a random access memory (RAM), cache and/or other dynamic storage devices for storing information to be executed by processor(s) 206. In some embodiments, memory 208 may also be used for storing peripheral interface maps. In an embodiment, peripheral interface maps may include mapping data specific to a peripheral interface. For example, peripheral interface maps may correlate user interaction (e.g., location) with a floating image of a peripheral interface to specific inputs (e.g., key selections) to be sent to the host computing device 102. Memory 208 also may be used for storing temporary variables or other intermediate information during execution of instructions to be executed by processor(s) 206. Memory 208 may, for example, include instructions to implement positioning of the display 11, the optical device 13, and/or the entire image system 10 to provide floating image in a position that may be best perceived by a user.

In some embodiments, communication system 202 may be configured to communicate with host computing device 102 and/or remote computing device 104. In some embodiments, communication system 202 may be configured to receive interface maps from host computing device 102 and/or remote computing device 104. The interface maps can be, for example, one or more images to display as a floating image that have selectable portions, and corresponding data indicative of what information should be provided for each selectable portion when that portion is selected. In some embodiments, the communication system 202 may be configured to communicate information of the selected portion(s) to host computing device 102. In some embodiments, the communication system 202 may be configured to communicate information of the selected portion(s) to a remote computing device 104.

In some embodiments, controller 50 includes peripheral interface controls 204. In some embodiments, peripheral interface controls 204 may be implemented as software. In some embodiments, peripheral interface controls 204 may utilize mapping data (e.g., peripheral interface maps) stored in the memory 208 to correlate specific portions of the peripheral interface with specific key selections or gestures. In some embodiments, peripheral interface controls 204 may receive user interaction information from the sensor(s) 12. In some embodiments, peripheral interface controls 204 may be configured to determine a key selection or gesture made on the floating image of the peripheral interface based on the user interaction information from the sensor(s).

FIGS. 3-10 illustrate example peripheral interfaces that may be generated as a floating image by peripheral device 106. In some embodiments, each peripheral interface as illustrated in FIGS. 3-10 may be generated as floating image 14. In some embodiments, the peripheral interface may detect a portion (e.g., a location, a position) of the floating image that a user interacts with by "touching" the floating image (e.g., with a finger, hand, object, etc.) enabling an operation of indication to be determined as it crosses through or touches a point on the floating image in air, and recording and/or processing the X,Y-coordinates and/or X, Y, Z-coordinates on the floating image as input for transmitting control data to a separate device (e.g., host computing device 102 or remote computing device 104). In some embodiments, the "touching" of the floating image may correspond to a key selection, a gesture, a movement, etc. on the peripheral interface. In some embodiments, a user may choose between peripheral interfaces such as a keyboard, trackpad, keypad, mouse click buttons, standard button controls such as play, stop, right, left, and the like. In some embodiments, interaction with the floating image at the same X, Y, Z-coordinates may correspond to different key selections depending on the current peripheral interface.

In some examples, the user interaction with the floating image of the peripheral interface may correspond to different types of input information sent to the host computing device 102. For example, user inputs to a keyboard peripheral interface may be sent as ASCII-type data corresponding to key selections on a keyboard, whereas user inputs to a cursor peripheral interface may sent as positional data to control a cursor.

Figure 3:
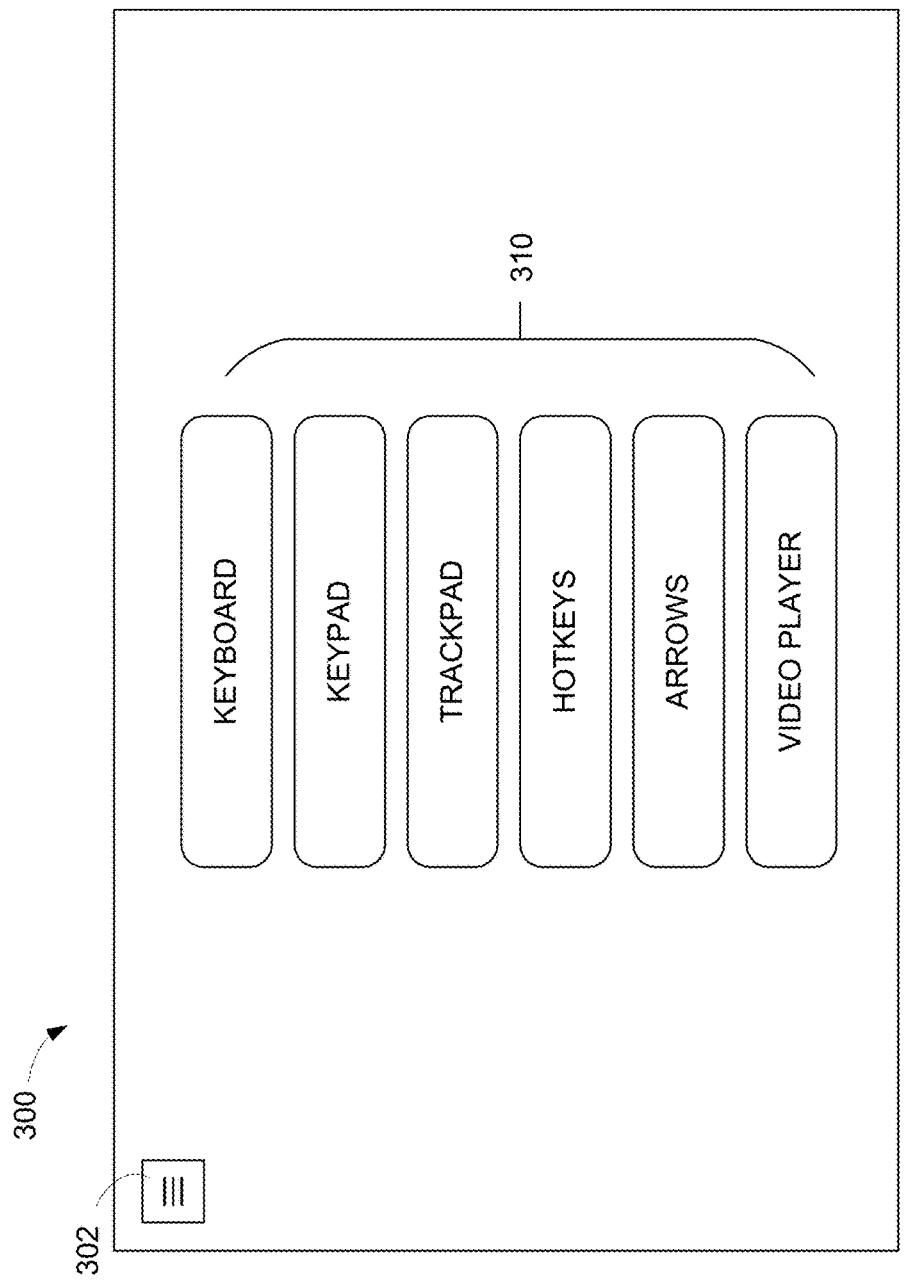
FIG. 3 illustrates an example peripheral interface of a peripheral interface selection menu.

FIG. 3 is an example peripheral interface of a peripheral interface selection menu 300. As illustrated in FIG. 3, floating image 14 may be of a peripheral interface selection menu. Peripheral interface selection menu 300 may include peripheral interface selections 310. In some embodiments, peripheral interfaces may include a keyboard peripheral interface, a number keypad ("numpad") interface, a trackpad interface, a hotkeys interface, an arrows peripheral interface, and a video player peripheral interface. In an embodiment, the peripheral device 106 may detect a portion (e.g., location, position) of the floating image of the selection menu peripheral interface that a user interacts with as corresponding to a selection of a peripheral interface to display. In an embodiment, mapping data corresponding to the peripheral interface selection menu may be used to correlate specific portions of the floating image with selections. Peripheral interface selection menu 300 may be accessed by selection of peripheral interface selection icon 302, illustrated in FIG. 3 as an icon in the upper lefthand corner. Peripheral interface selection menu icon 302 may be displayed in any location within the peripheral interface.

Figure 4:
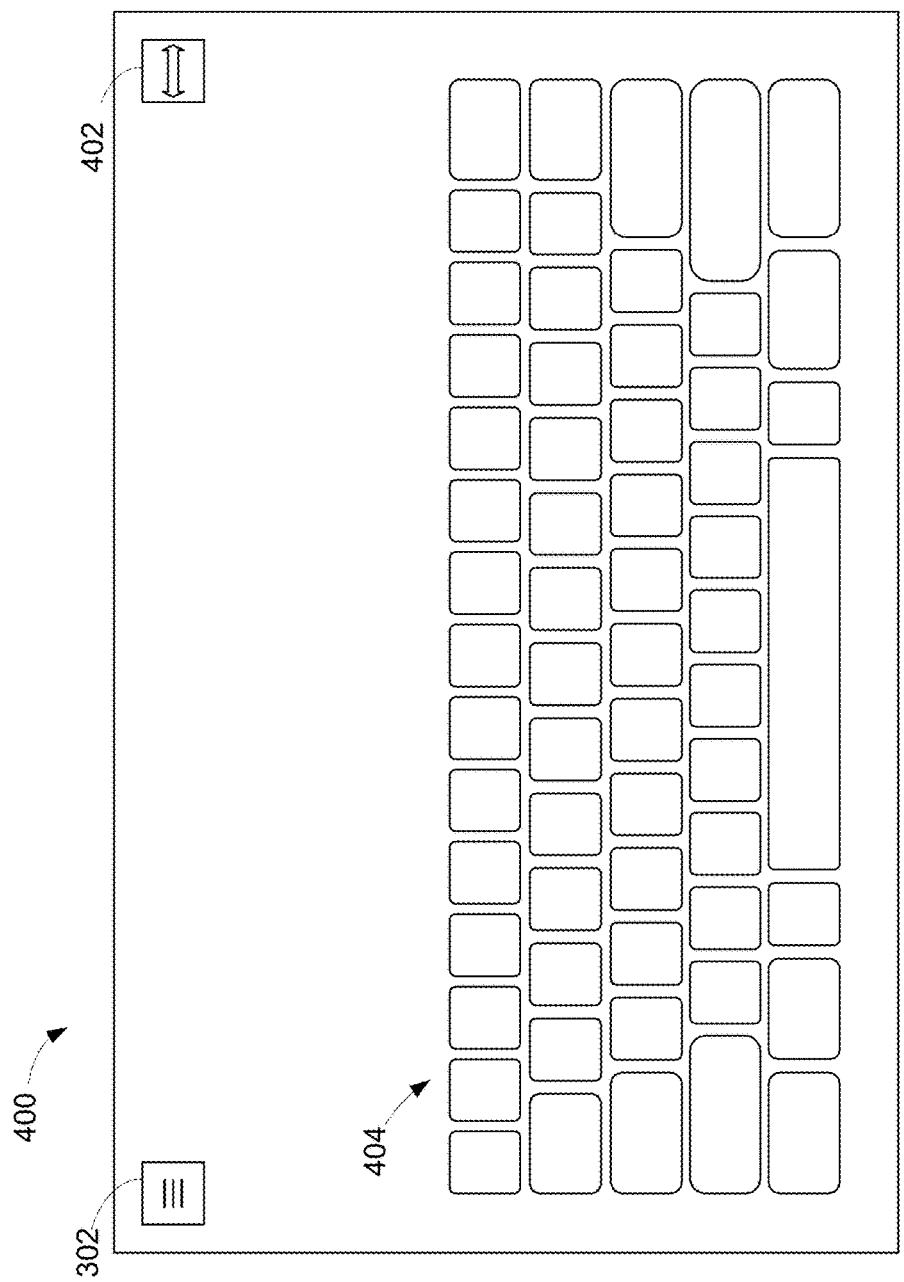
FIG. 4 illustrates an example peripheral interface of a keyboard.

FIG. 4 is an example peripheral interface of a keyboard. As shown in FIG. 4, a keyboard peripheral interface 400 may be generated as a floating image by the peripheral device 106. In an embodiment, the peripheral device 106 may detect a portion (e.g., location, position) of the floating image of the keyboard peripheral interface 400 that a user interacts with as corresponding to a key selection on a keyboard 404. In some embodiments, keyboard 404 may include letter key selections and/or other related key selections such as numerals, controls, and/or any other key that may be included in a keyboard layout. In an embodiment, mapping data corresponding to the keyboard peripheral interface 400 may be used to correlate specific portions of the floating image with inputs of the keyboard peripheral interface 400. In some embodiments, mapping data may in the form of an interface map. In an embodiment, inputs may include peripheral-type data. For example, in the context of the keyboard peripheral interface 400, peripheral device 106 may transmit ASCII-encoded data to the host computing device 102.

As shown in FIG. 4, keyboard peripheral interface may include peripheral interface selection menu 302 and peripheral interface toggle 402. Peripheral interface toggle 402 may switch the peripheral interface currently displayed by peripheral device 106.

In some embodiments, the peripheral interface may be toggled or switched by additional user interaction with the floating image. For example, user interactions such as swiping, selecting a right side of the peripheral interface (e.g., forward switch), selecting a left side of the peripheral interface (e.g., backward switch), or other gestures may scroll through the peripheral interface.

Figure 5:
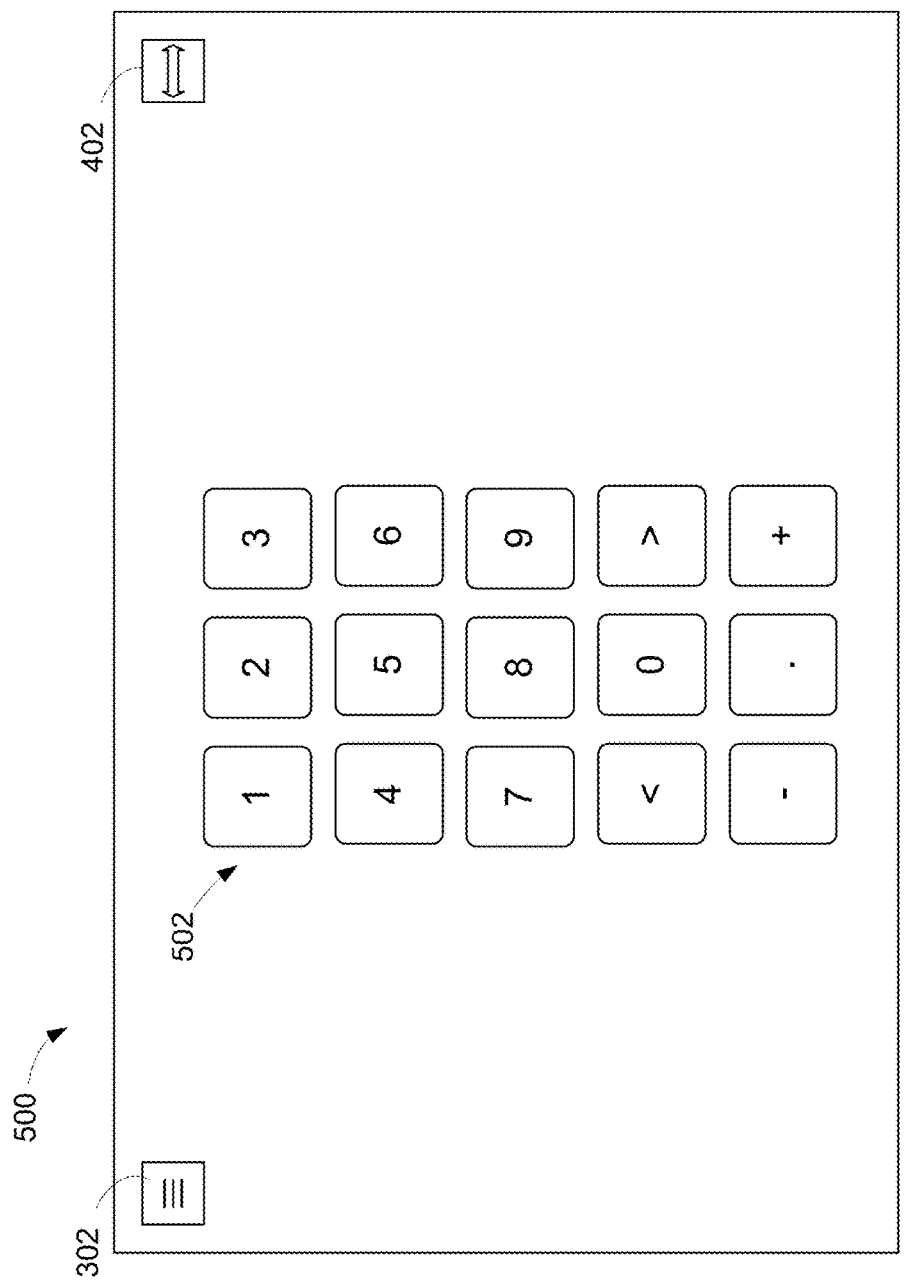
FIG. 5 illustrates an example peripheral interface of a number keypad.

FIG. 5 is an example peripheral interface of a number keypad ("numpad"). As shown in FIG. 5, in some embodiments, a numpad peripheral interface 500 may be generated as a floating image by the peripheral device 106. In an embodiment, the peripheral device 106 may detect a portion (e.g., location, position) of the floating image of the numpad peripheral interface 500 that a user interacts with as corresponding to a key selection on a numpad 502. In some embodiments, numpad 502 may include numeric key selections and/or other related key selections such as a decimal point key, math operation keys, etc. In an embodiment, mapping data corresponding to the numpad peripheral interface 500 may be used to correlate specific portions of the floating image with inputs of the numpad peripheral interface 500. In an embodiment, inputs may include peripheral-type data. For example, in the context of a numpad peripheral interface 500, peripheral device 106 may transmit ASCII-encoded data to the host computing device 102. As shown in FIG. 5, numpad peripheral interface 500 may include peripheral interface selection menu 302 and peripheral interface toggle 402.

Figure 6:
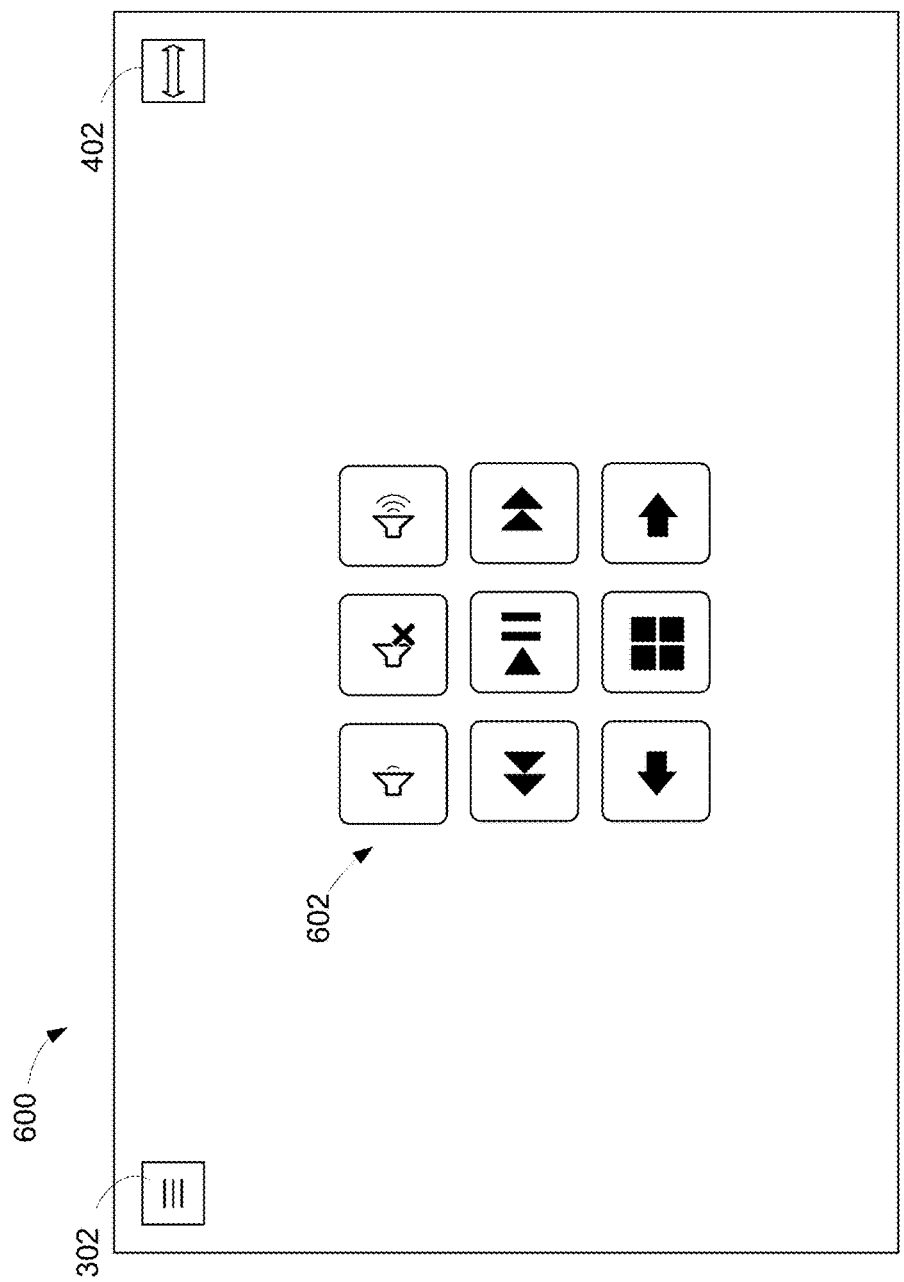
FIG. 6 illustrates an example peripheral interface of a device control menu.

FIG. 6 is an example peripheral interface of a device control menu. As shown in FIG. 6, a device control peripheral interface 600 may be generated as a floating image by the peripheral device 106. In an embodiment, the peripheral device 106 may detect a portion (e.g., location, position) of the floating image of the device control peripheral interface 600 that a user interacts with as corresponding to a key selection on device control menu 602. In some embodiments, device control menu 602 may include key selections such as volume control, play/pause, fast-forward/rewind, left/right arrows, Windows panel, and/or any other related keys. In an embodiment, mapping data corresponding to the device control peripheral interface 600 may be used to correlate specific portions of the floating image with inputs of the device control peripheral interface 600. In an embodiment, inputs may include peripheral-type data. For example, in the context of a device control peripheral interface 600, peripheral device 106 may transmit specific commands that control the interface and/or hardware components of the host, e.g., such as to control the volume of content playing on the host computing device. As shown in FIG. 6, device control peripheral interface 600 may include peripheral interface selection menu 302 and peripheral interface toggle 402.

Figure 7:
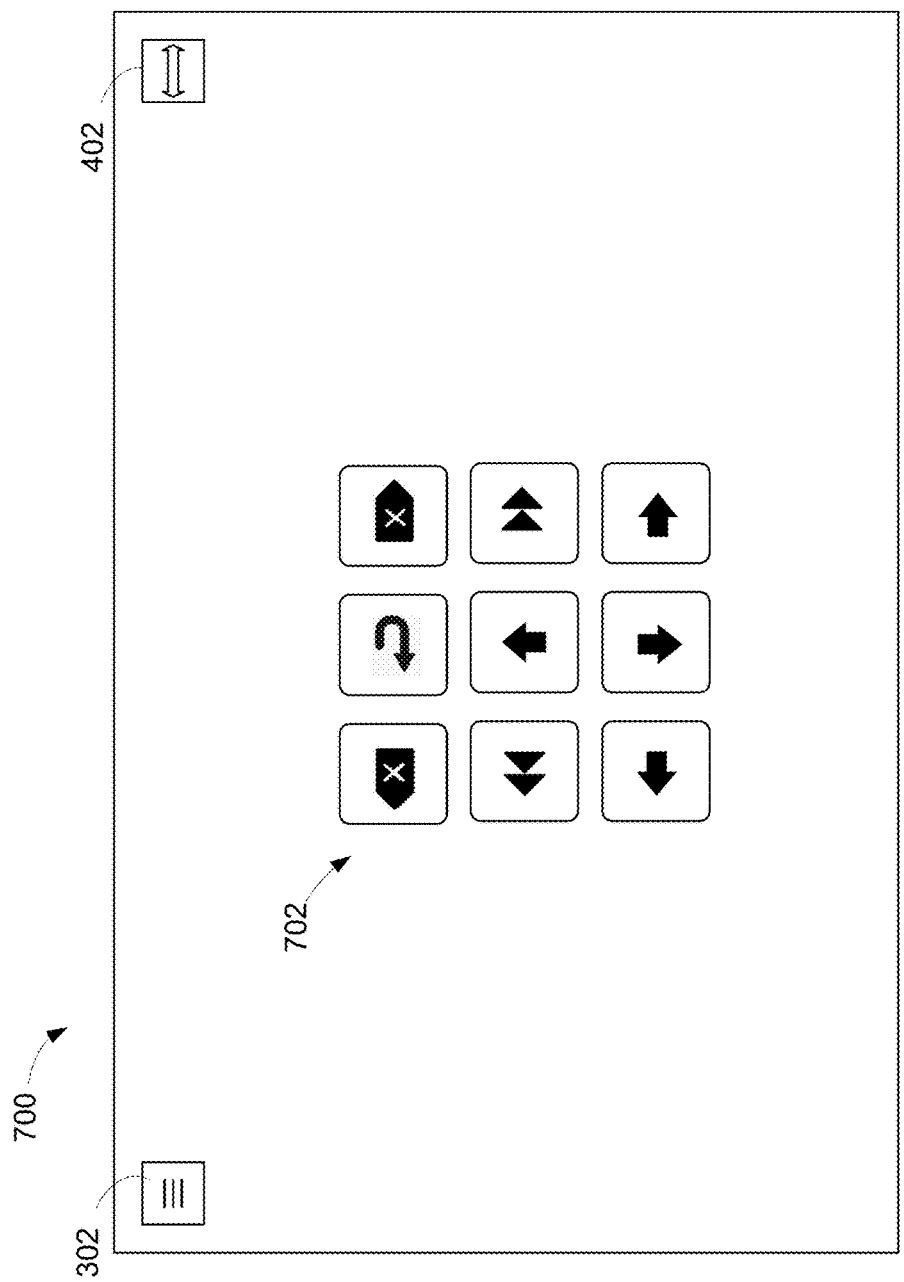
FIG. 7 illustrates an example peripheral interface of an arrow menu.

FIG. 7 is an example peripheral interface of an arrow controls. As shown in FIG. 7, an arrows peripheral interface 700 may be generated as a floating image by the peripheral device 106. In an embodiment, the peripheral device 106 may detect a portion (e.g., location, position) of the floating image of the control peripheral interface that a user interacts with as corresponding to a key selection on an arrows interface 700. In some embodiments, arrows interface may include arrow key selections 702 such as up/down/left/right arrow keys, return/enter, fast-forward/rewind, delete/backspace, and/or any other related keys. In an embodiment, mapping data corresponding to the arrows peripheral interface 700 may be used to correlate specific portions of the floating image with inputs of the arrows peripheral interface 700. In an embodiment, inputs may include peripheral-type data. For example, in the context of a arrows peripheral interface, peripheral device 106 may transmit specific commands that control the interface of the host, e.g., such as moving arrow keys on the host computing device. As shown in FIG. 7, arrows peripheral interface 700 may include peripheral interface selection menu 302 and peripheral interface toggle 402.

Figure 8:
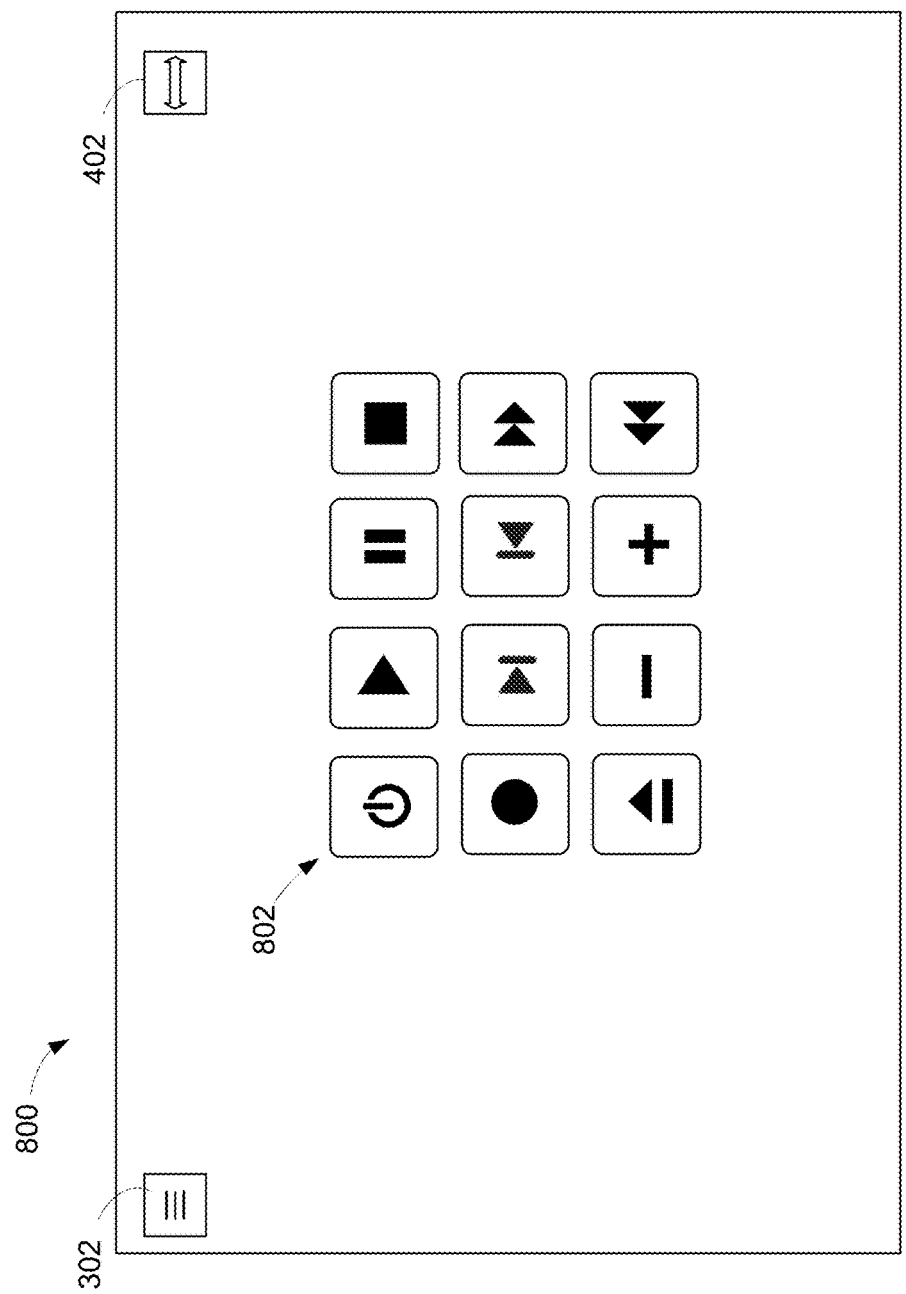
FIG. 8 illustrates an example peripheral interface of a video player menu.

FIG. 8 is an example peripheral interface of a video player menu. As shown in FIG. 8, a video player peripheral interface 800 may be generated as a floating image by the peripheral device 106. In an embodiment, the peripheral device 106 may detect a portion (e.g., location, position) of the floating image of the video player peripheral interface 800 that a user interacts with as corresponding to a key selection on a video player menu 802. In some embodiments, the video player menu 802 may include key selections such as power on/off, play, pause, stop, record, skip/backtrack, fast-forward/re-wind, eject, and/or any other related keys. In an embodiment, mapping data corresponding to the video player peripheral interface may be used to correlate specific portions of the floating image with inputs of the video player peripheral interface 800. In an embodiment, inputs may include peripheral-type data. For example, in the context of a video player, peripheral device 106 may transmit specific commands that control the interface and/or hardware components of the host, e.g., such as to control the playback of video content on the host computing device 106. As shown in FIG. 8, video player peripheral interface 800 may include peripheral interface selection menu 302 and peripheral interface toggle 402.

In some embodiments, key selections on a peripheral interface may be customized. For example, in some embodiments, peripheral interfaces, such as the ones shown in FIGS. 6-8, may include any key selections. In some embodiments, the pre-set peripheral interfaces, as shown in FIGS. 3-8, may be edited by a user to include any number of keys selections or remove any number of key selections. In some embodiments, a user may create a new, customized peripheral interface with any number of desired key selections. For example, a user may fill a 3×3 key selection layout, as shown in FIGS. 6-8, with any desired key selections.

Figure 9:
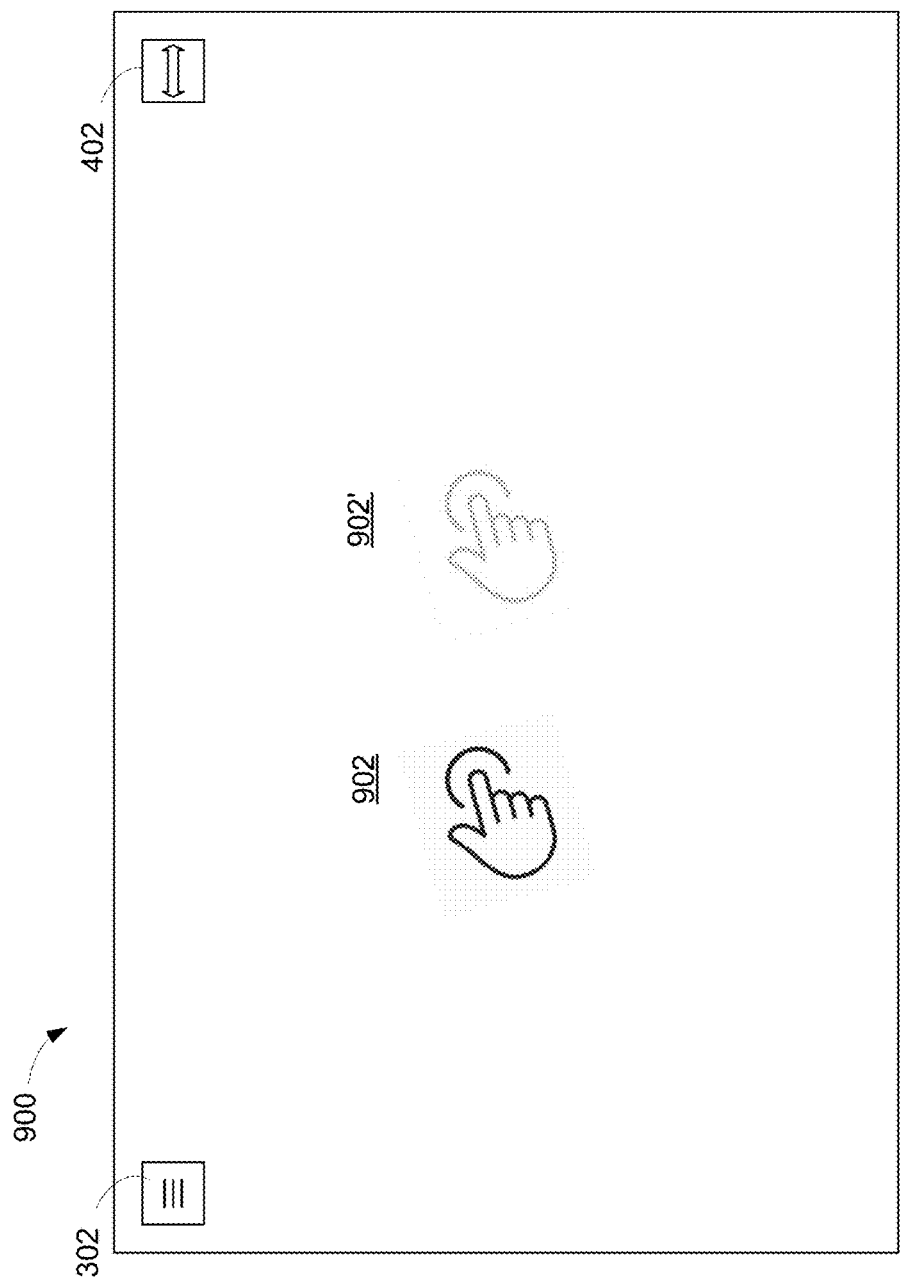
FIG. 9 illustrates an example user interaction with a trackpad peripheral interface.

FIG. 9 illustrates a user interaction with the peripheral interface on an example peripheral interface of a trackpad. As shown in FIG. 9, a trackpad peripheral interface 900 may be generated as a floating image by the peripheral device 106. In an embodiment, the peripheral device 106 may detect a portion (e.g., location, position) of the floating image of the trackpad peripheral interface 900 that a user interacts with as corresponding to a movement of a cursor. In an embodiment, mapping data corresponding to the trackpad peripheral interface 900 may be used to correlate specific portions of the floating image with inputs of the trackpad. In an embodiment, inputs may include peripheral-type data. In an embodiment, in the context of a trackpad peripheral interface 900, peripheral device 106 may transmit coordinates of the user interaction with the floating image 14 that correspond to movement of a cursor on host computing device 102. For example, 902 and 902' may correspond to the start and end points of a dragging movement on the trackpad peripheral interface 900, respectively. As shown in FIG. 9, trackpad peripheral interface 900 may include peripheral interface selection menu 302 and peripheral interface toggle 402.

Figure 10:
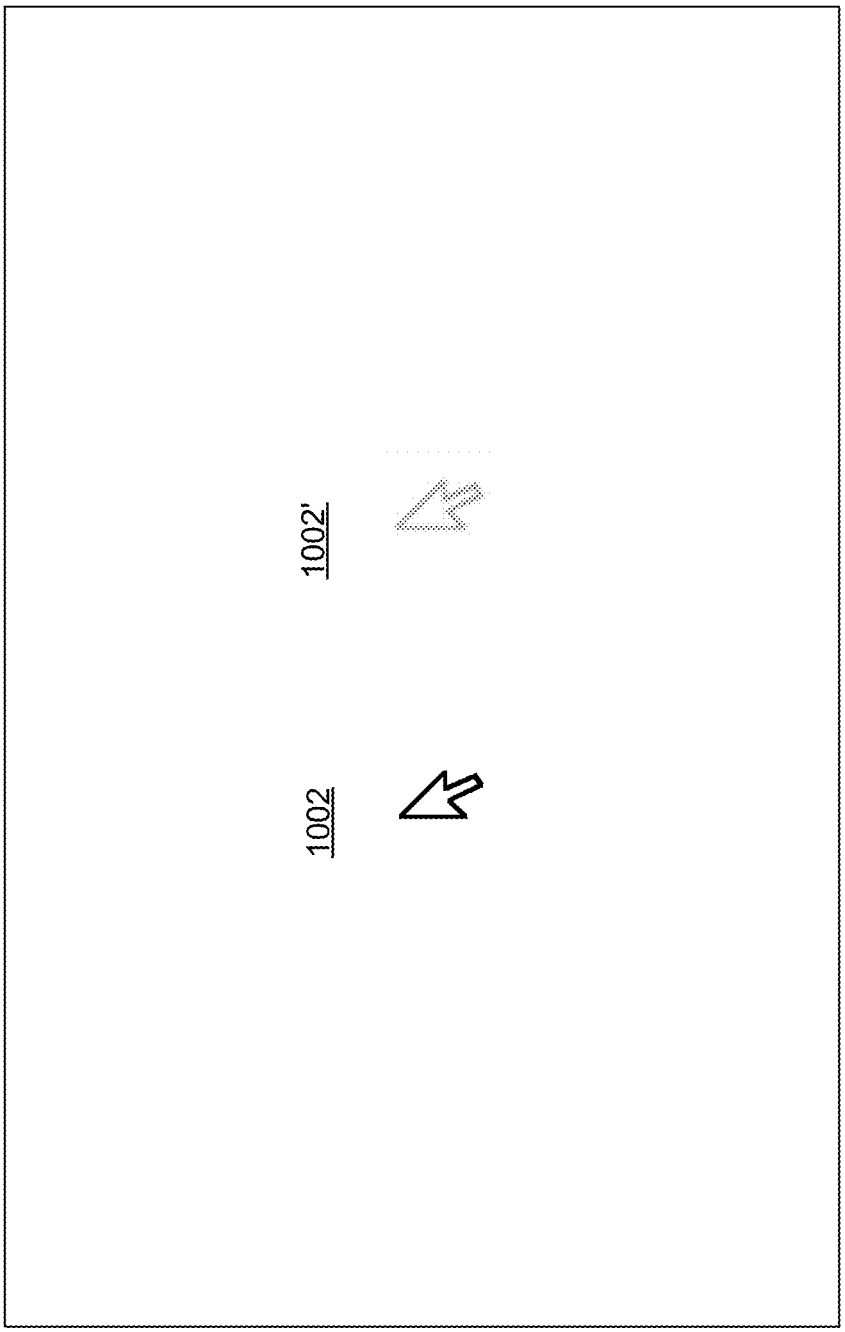
FIG. 10 illustrates an example display of a host computing device corresponding to the user interaction with the trackpad peripheral interface in FIG. 9.

FIG. 10 illustrates an example display of a host computing device corresponding to the user interaction with the peripheral interface in FIG. 9. For example, in an embodiment, the dragging movement on the trackpad peripheral interface 900 of the peripheral device 106 may correspond to movement of a cursor on the display of the host computing device 102. For example, 1002 and 1002' may correspond to the start and end location of a cursor on the display of the host computing device 102, that further correspond to the start and end points 902 and 902' on the trackpad peripheral interface 900.

In some embodiments, more than one peripheral interface may be displayed at the same time. For example, the peripheral device 106 may be configured to generate a floating image of more than one peripheral interface. In some embodiments, peripheral interfaces may be shown adjacent to one another For example, a keyboard interface 400 may be displayed at the same time as a numpad interface 500. In this example, numpad interface 500 may be displayed adjacent to the keyboard interface 400 in order to mimic a full size keyboard layout. In some embodiments, a user may customize the number and layout of peripheral interfaces simultaneously generated by the peripheral device 106.

FIGS. 11A-11D illustrate an example user interaction at a location that corresponds to different key selections of different peripheral interfaces.

Figure 11B:
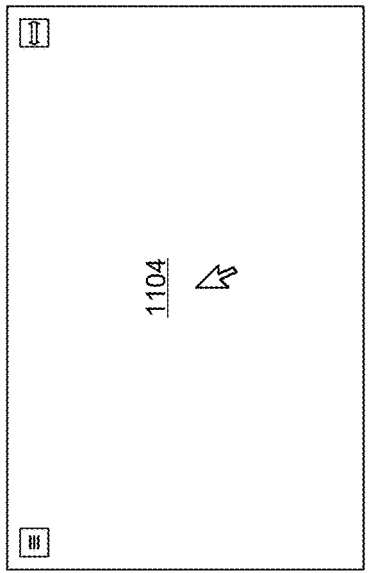
FIGS. 11A-D illustrate an example user interaction at a location that corresponds to different inputs of different peripheral interfaces.
Figure 11C:
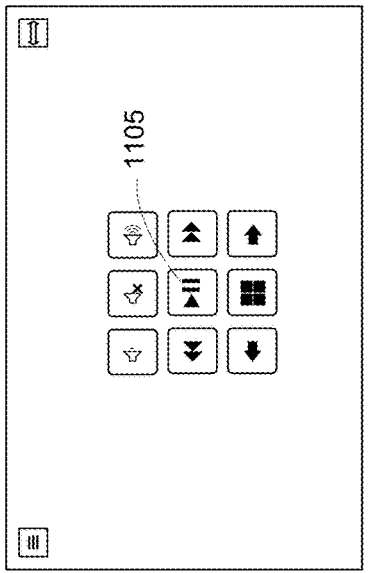
Figure 11D:
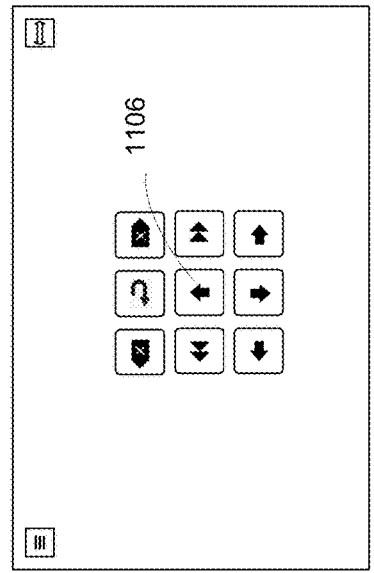
Figure 11A:
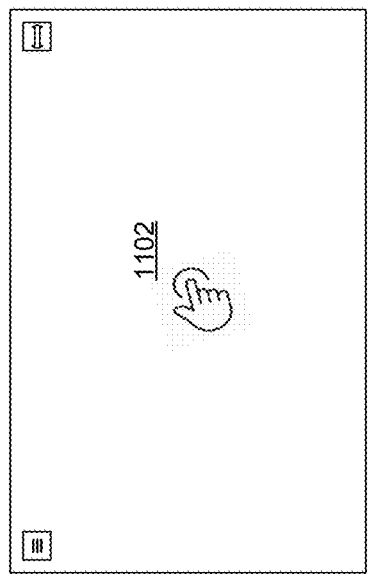

FIG. 11A illustrates a peripheral interface with a user interaction 1102 at a location on the interface. For example, user interaction 1102 may be determined by the peripheral device 106 to be at a location defined by coordinates (X, Y, Z) on the floating image. It is noted that user interaction 1102 may occur on different peripheral interfaces as illustrated by FIGS. 11B-11D. It is noted that user interaction 1102 may occur on any peripheral interface other than the ones shown in FIGS. 11B-11D.

In some embodiments, depending on which peripheral interface is currently displayed, a user interaction at a location may correspond to a different input on the peripheral interface. For example, FIG. 11B illustrates input 1104 at coordinates (X, Y, Z) of user interaction 1102 on a trackpad peripheral interface. As shown, input 1104 corresponds to a location of a cursor on the trackpad peripheral interface. FIG. 11C illustrates input 1105 at coordinates (X, Y, Z) of user interaction 1102 on a device control peripheral interface. As shown, input 1105 corresponds to a play/pause key selection on the device control peripheral interface. FIG. 11D illustrates input 1106 at coordinates (X, Y, Z) of user interaction 1102 on a device control peripheral interface. As shown, input 1106 corresponds to an "up" arrow key selection on the peripheral interface.

Figure 12:
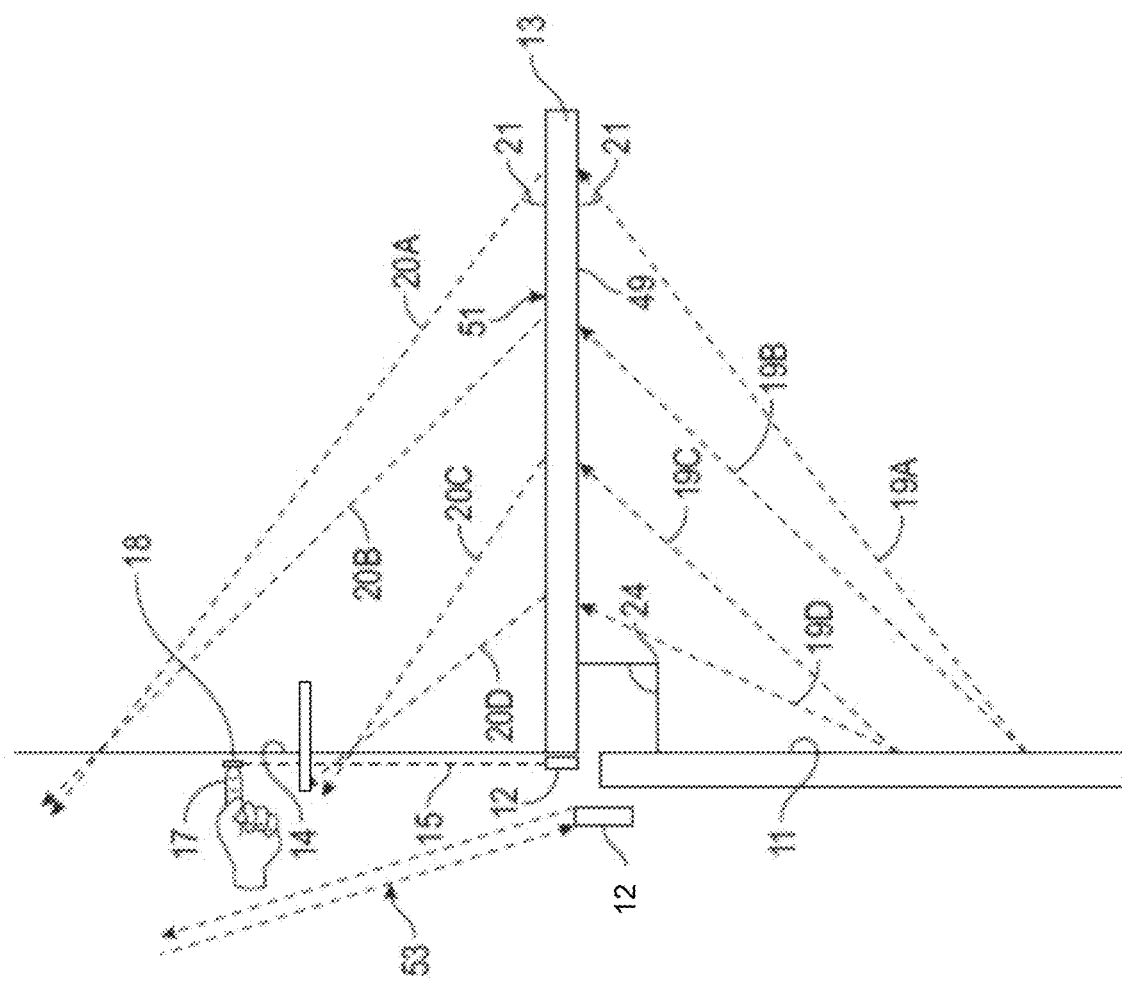
FIG. 12 illustrates an example of a peripheral device within the contactless peripheral interface system.

FIG. 12 illustrates an example of a side view of a configuration of components of a peripheral device 106 within a contactless peripheral interface system 100. The peripheral device 106 includes display 11 and optical device 13, where a planar surface of the display 11 is positioned at an angle 24 relative to a planar surface of the optical device 13. The display 11 emits light 19 that is received by first surface 49 of the optical device 13. A second surface 51 of the optical device emits light 20 in a direction generally towards where a user of the interface will be, and the emitted light 20 forms the floating image 14. For example, light beams 19A and 19B are emitted from a point on the display 11, are received by different portions of optical device 13, and are reflected as light beams 20A and 20B such that they intersect at a point forming a portion the floating image 14. In this embodiment, the light 19 impinges on the optical device 13 at an angle 21 and light 20 propagates from the optical device at the same angle 21. In some embodiments, the angle that light impinges on the optical device 13 is different than the angle that light propagates away from the optical device 13. For example, the optical device 13 may be a DCA having reflective surfaces which are angled to cause the light to be received at a first angle and propagate away from the optical device 13 at a different angle.

In some embodiments, sensor(s) 12 may be positioned such that a signal 15 is emitted from sensor(s) 12 and travels along a path generally parallel to the floating image 14. When a user performs an in air indication 17 by making and in air contact 18 at a certain point on (or near) the floating image 18, a portion of the signal 15 is reflected back to the sensor(s) 12, providing information on where the air indication was made, and this can be correlated to a portion of the floating image 14 to determine a selection on the floating image 14. Sensor(s) 12 may also be positioned such that it can provide a signal 53 to sense user information, which is communicated to the controller and can be used to control the positional assembly to generate the floating image 14 in a particular location. In various embodiments, the sensor(s) 12 can sense information relating the user's eyes. For example, information that can be used to determine the location of the user's eyes or the user's line of sight. In some embodiments, the sensor(s) 12 includes a camera, and the controller includes image processing software that includes feature detection such that it can determine a position of the user's eyes, hand gestures made by the user, and the like, and provide control information positional assembly to control the position where the floating image 14 is generated, such that floating image 14 is generated based on the position of the user's eyes or based on one or more hand gestures of the user.

Figure 13:
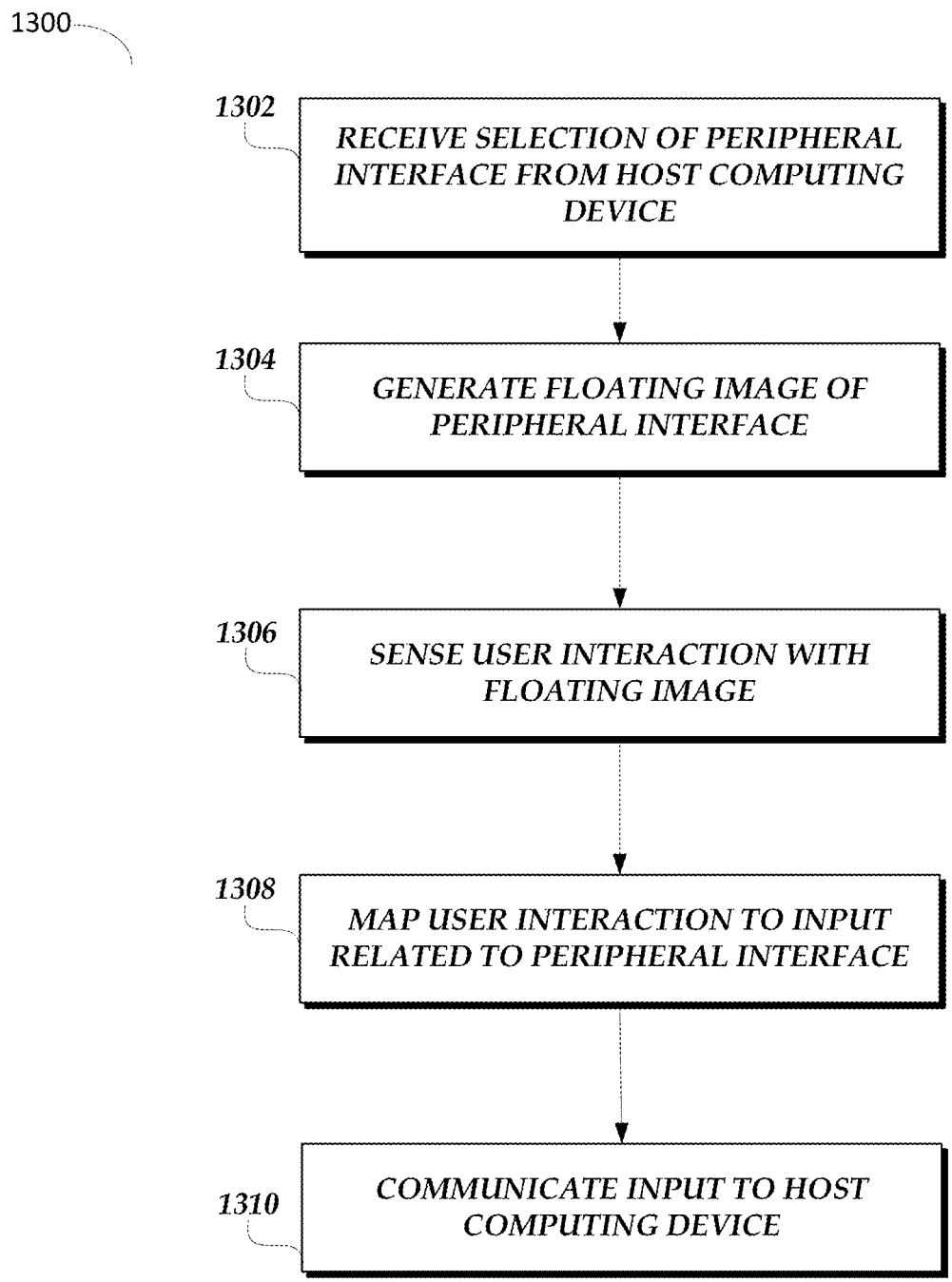
FIG. 13 a flow diagram depicting an example routine for operating a contactless peripheral interface.

FIG. 13 illustrates an example of a process 1300 for operating a contactless peripheral interface, according to some embodiments. In some embodiments, process 1300 may be executed by peripheral device 106 within contactless peripheral interface system 100.

At block 1302, peripheral device 106 receives selection of a peripheral interface from a host computing device 102. In some embodiments, the selection corresponds to one of plurality of peripheral interfaces. In some embodiments, the plurality of peripheral interfaces includes a keyboard, a trackpad, a keypad, a numpad, a control menu, a volume control, and a video control menu.

At block 1304, peripheral device 106 generates a floating image of the peripheral interface. In some embodiments, peripheral device 106 generates the floating image of the peripheral interface by an image system.

At block 1306, peripheral device 106 senses user interaction with the floating image. In some embodiments, peripheral device 106 senses, by a sensor assembly, a position of a user interaction with the floating image of the peripheral interface.

At block 1308, peripheral device 106 maps user interaction to input related to the peripheral interface. In some embodiments, the peripheral device 106 maps the position of the user interaction to an input relating to the selected peripheral interface. In some embodiments, mapping further comprises receiving, from the host device, an interface map for the selected peripheral interface. In some embodiments, mapping further comprises associating the positions of the user interaction with inputs onto the peripheral interface according to the interface map. In some embodiments, the input corresponds to at least one of a key selection, cursor movement, or a gesture of the peripheral interface.

At block 1310, peripheral device 106 communicates the input to the host computing device 102. In some embodiments, the host computing device is configured to recognize the input as relating to the selected peripheral interface. For example, in some embodiments, the host computing device is configured to recognize the input as ASCII data, numeric data, coordinate data, motion data, hardware control data, and commands.

In some embodiments, process 1300 further comprises updating a display of the host computing device corresponding to the input.

In some embodiments, peripheral device 106 may communicate with a remote computing device 104. For example, in some embodiments, the steps of process 1300 may be implemented with respect to remote computing device 104. In an example, peripheral device 106 receives the selection of the peripheral interface from a remote computing device 104. In some embodiments, peripheral device 106 communicates the input to the remote computing device 104 wherein the remote computing device 104 is configured to recognize the input as relating to the selected peripheral interface.

Figure 14:
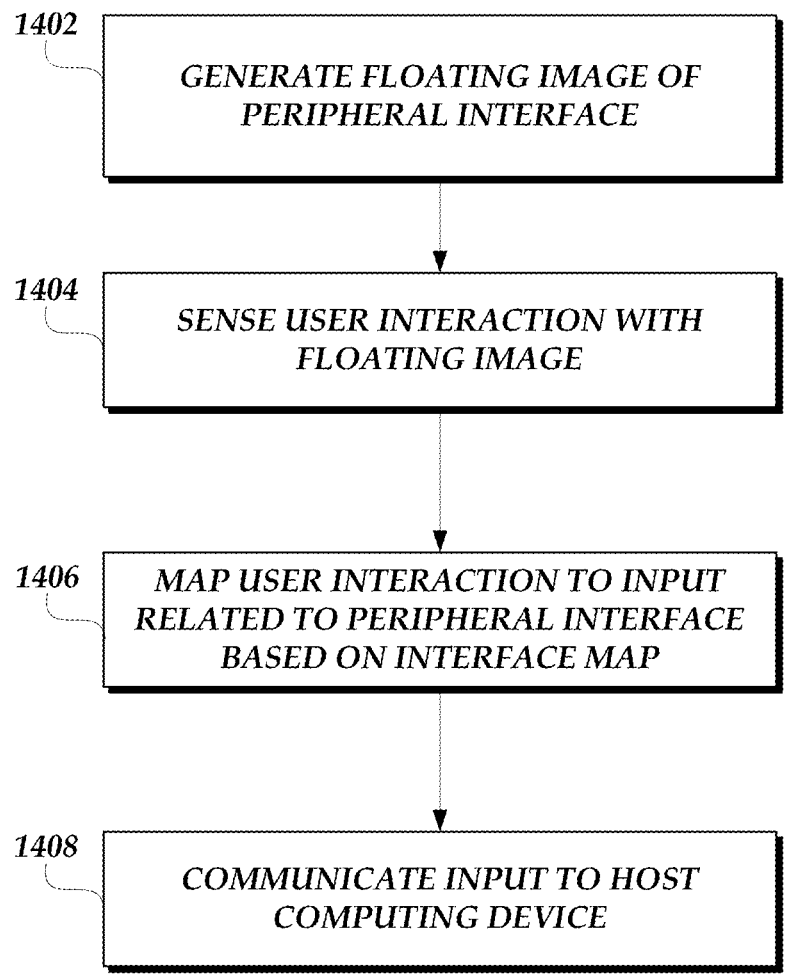
FIG. 14 a flow diagram depicting an example routine for operating a contactless peripheral interface in an additional embodiment.

FIG. 14 illustrates an example of a process 1400 for operating a contactless peripheral interface, according to some embodiments. In some embodiments, process 1400 may be executed by peripheral device 106 within contactless peripheral interface system 100.

At block 1402, peripheral device 106 generates a floating image of a peripheral interface. In some embodiments, peripheral device 106 may generate the floating image by an image system. In some embodiments, the peripheral interface includes a keyboard, a trackpad, a keypad, a numpad, a control menu, a volume control, and a video control menu.

At block 1404, peripheral device 106 senses user interaction with the floating image. In some embodiments, the peripheral device 106 may sense, by a sensor assembly, a position of a user interaction with the floating image of the peripheral interface.

At block 1406, peripheral device 106 maps user interaction to an input related to the peripheral interface based on an interface map. For example, in some embodiments, 106 may map the position of the user interaction to an input relating to the selected peripheral interface. In some embodiments, the input corresponds to at least one of a key selection, cursor movement, or a gesture of the peripheral interface. In some embodiments, the interface map comprises positional information associated with the selected peripheral interface. In some embodiments, the positional information of the interface map comprises locations of the interface associated with key selections.

At block 1408, peripheral device 106 communicates the input to the host computing device. In some embodiments, the host computing device is configured to recognize the input as relating to the selected peripheral interface. In some embodiments, the host computing device is configured to recognize the input as ASCII data, numeric data, coordinate data, motion data, hardware control data, and commands.

Sensory Feedback

In some embodiments, peripheral device 106 may be configured to provide sensory feedback to a user interacting with a floating image of a peripheral interface. For example, sensory feedback may include any combination of light/visual feedback, audio feedback, haptic feedback, etc. In some examples, sensory feedback may indicate to a user that a particular key has been highlighted, selected, about to be selected, etc. on the peripheral interface. In various embodiments, sensory input may be visual feedback (for example, on the floating image), audio feedback, and/or haptic feedback.

Visual Feedback

In some embodiments, peripheral device 106 may be configured to provide visual feedback discernable by a user in response to the user interacting with the floating image of a peripheral interface. For example, visual feedback may include highlighting a key, changing the background color of a key, changing the outline (e.g., color, brightness, pattern, visual appearance, etc.) of a key, or otherwise visually indicating user interaction with a portion of the floating image. In some embodiments, more than one visual feedback may be presented to the user. For example, given a numpad peripheral interface, a user may hover his or her finger over a specific key selection, such as a "5." In this example, the peripheral device 106 may recognize and highlight the "5" key, such as displaying the key in a different color. Upon user selection of the "5" key, the peripheral interface 106 may be configured to display the key in a different color to indicate selection of the key.

Audio Feedback

In some embodiments, peripheral device 106 may be configured to provide audio feedback as a form of sensory feedback in response to a user interacting with the floating image of a peripheral interface. For example, audio feedback may include sounds, noises, alerts, bells, chimes, etc. that may indicate to a user that certain gestures or key selections are being made on the peripheral interface.

Haptic Feedback

In some embodiments, peripheral device 106 may be configured to provide haptic and/or tactile feedback as a form of sensory feedback in response to a user interacting with the floating image of a peripheral interface. In some embodiments, haptic feedback may provide the user with a tactile sensation during interaction with the peripheral interface. For example, in some embodiments, haptic feedback may be in the form of mid-air ultrasonic pulses (e.g., such as through an array of ultrasonic emitters). See Appendix A for more details on mid-air ultrasonic haptic interface technologies that may be used to provide a user interacting with the floating image haptic feedback.

In some embodiments, peripheral device 106 may be configured to provide a combination of visual, audio, and haptic feedback in response to user interaction with the floating image of a peripheral interface. For example, a user may hover his or her finger over a specific key selection, prompting the peripheral device 106 to visually highlight the key, such as displaying the key in a different color. Upon user selection of the key, the peripheral device 106 may emit an audio sound, such as a chime, to indicate selection.

In some embodiments, a user may configure the type of sensory feedback provided upon interaction with the peripheral interface.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. As one of skill in the art will appreciate, computer systems, devices, and components often can have one processor or can have more than one processor which are configured to perform certain functionality. Accordingly, as used herein "a processor" and "one or more processors" and "at least one processor" relates to embodiments that may have one processor or a plurality of processors unless otherwise explicitly indicated. As an example, disclosure of "a single processor" or "one processor" may refer to an implementation with one processor, based on the context The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIG.s should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A method comprising:
   generating, in air, a floating image of a peripheral interface selection menu including a plurality of peripheral interfaces selections by an image system included in a peripheral device;
   selecting, by a user, a peripheral interface from the peripheral interface selection menu;
   receiving information of the selection from a host computing device, the selection corresponding to one of the plurality of peripheral interfaces, wherein the plurality of peripheral interfaces for the peripheral device includes a keyboard, a trackpad, a keypad, a numpad, a control menu, a volume control, and/or a video control menu, and wherein the received information includes an interface map for the selected peripheral interface;

generating, by the image system in communication with the host computing device, a floating image of the selected peripheral interface in air;

sensing, by a sensor assembly, positions of the user interaction with the floating image of the peripheral interface;

mapping, by a controller, the position of the user interaction to an input relating to the selected peripheral interface based on the interface map for the selected peripheral interface; and communicating the input to the host computing device.

2. The method of claim 1, wherein the input corresponds to at least one of a key selection, cursor movement, or a gesture of the peripheral interface.

3. The method of claim 1, wherein the host computing device is configured to recognize the input as relating to the selected peripheral interface.

4. The method of claim 1, wherein the host computing device is configured to recognize the input as ASCII data, numeric data, coordinate data, motion data, hardware control data, and commands.

5. The method of claim 1, further comprising updating a display of the host computing device corresponding to the input.

6. The method of claim 1, further comprising:

receiving the selection of the peripheral interface from a remote computing device; and communicating the input to the remote computing device, wherein the remote computing device is configured to recognize the input as relating to the selected peripheral interface.

7. A contactless peripheral interface system, comprising:

a peripheral device comprising a controller having a computer hardware processor configured to communicate with a host computing device, the peripheral device including:

an image system that generates a floating image of a peripheral interface selection menu including a plurality of peripheral interfaces selections;

a sensor assembly that senses a position of a user interaction with the floating image of the peripheral interface; and the controller in communication with the image system and the sensor assembly, the controller configured to:

in response to a selection of a peripheral interface from the peripheral interface selection menu by the user, receive information of the selection of the peripheral interface from the host computing device, wherein the selection corresponds to one of plurality of peripheral interfaces, and wherein the plurality of peripheral interfaces includes a keyboard, a trackpad, a keypad, a numpad, a control menu, a volume control, and/or a video control menu;

coordinate generation of the floating image of the selected peripheral interface in air based on the selection;

receive the position of the user interaction with the floating image of the peripheral interface;

map the position of the user interaction to an input relating to the selected peripheral interface;

receive, from the host device, an interface map for the selected peripheral interface;

associate the positions of the user interaction with an input onto the peripheral interface according to the interface map; and communicate the input to the host computing device.

8. The contactless peripheral interface system of claim 7, wherein the input corresponds to at least one of a key selection, cursor movement, or a gesture of the peripheral interface.

9. The contactless peripheral interface system of claim 7, wherein the host computing device is configured to recognize the input as relating to the selected peripheral interface.

10. The contactless peripheral interface system of claim 7, wherein the host computing device is configured to recognize the input as ASCII data, numeric data, coordinate data, motion data, hardware control data, and commands.

11. The contactless peripheral interface system of claim 7, wherein the controller is further configured to update a display of the host computing device corresponding to the input.

12. The contactless peripheral interface system of claim 7, wherein the system further comprises:

a remote computing device in communication with the peripheral device;

wherein the controller is further configured to:

receive the selection of the peripheral interface from the remote computing device; and communicate the input to the remote computing device, wherein the remote computing device is configured to recognize the input as relating to the selected peripheral interface.

* * * * *